United States Patent
Spitzer et al.

(10) Patent No.: US 12,251,673 B2
(45) Date of Patent: Mar. 18, 2025

(54) SYNTHESIS OUTSIDE HIGH AND LOW TEMPERATURE EQUILIBRIUM BY SPRAY FLASH SYNTHESIS

(71) Applicants: Centre National de la Recherche Scientifique, Paris (FR); ISL—Institut Franco-Allemand de Recherches de Saint-Louis, Saint-Louis (FR); Université de Strasbourg, Strasbourg (FR)

(72) Inventors: Denis Spitzer, Oberschaeffolsheim (FR); Marc Comet, Huningue (FR); Valérie Keller, Oberschaeffolsheim (FR); Martin Klaumünzer, Lörrach (DE)

(73) Assignees: CENTRE NATIONAL DE LA RECHERCHE SCIENTIFIQUE, Paris (FR); ISL—INSTITUT FRAN CO-ALLEMAND DE RECHERCHES, Saint-Louis (FR); UNIVERSITÉ DE STRASBOURG, Strasbourg (FR)

( * ) Notice: Subject to any disclaimer, the term of this patent is extended or adjusted under 35 U.S.C. 154(b) by 859 days.

(21) Appl. No.: 17/286,932

(22) PCT Filed: Oct. 22, 2019

(86) PCT No.: PCT/EP2019/078770
§ 371 (c)(1),
(2) Date: Apr. 20, 2021

(87) PCT Pub. No.: WO2020/083942
PCT Pub. Date: Apr. 30, 2020

(65) Prior Publication Data
US 2021/0354103 A1  Nov. 18, 2021

(30) Foreign Application Priority Data
Oct. 22, 2018  (FR) .................................... 18 59736

(51) Int. Cl.
*B01J 14/00* (2006.01)
*B01J 8/00* (2006.01)
*B01J 19/14* (2006.01)

(52) U.S. Cl.
CPC .............. *B01J 14/00* (2013.01); *B01J 8/005* (2013.01); *B01J 19/14* (2013.01); *B01J 2219/00051* (2013.01); *B01J 2219/00162* (2013.01)

(58) Field of Classification Search
CPC ... B01J 14/00; B01J 8/005; B01J 19/14; B01J 2219/00051; B01J 2219/00162
See application file for complete search history.

(56) References Cited

U.S. PATENT DOCUMENTS 10,946,305 B2 *  3/2021  Risse ....................... B01D 1/16

FOREIGN PATENT DOCUMENTS

| EP | 0492880 A2 | 7/1992 | |
|---|---|---|---|
| FR | 3061439 A1 | 7/2018 | |
| JP | H04325405 A | 11/1992 | |
| JP | 2005177662 A | 7/2005 | |
| JP | 2014035809 A | 2/2014 | |
| WO | WO-2013117671 A1 * | 8/2013 | ............... B01D 1/18 |
| WO | WO-2016001445 A1 * | 1/2016 | ........... A61K 31/194 |

OTHER PUBLICATIONS

Kitamura et al. (Journal of Alloys and Compounds 455 (2008) L1-L5). (Year: 2008).*
Klaumuenzer, M. et al., "Continuous Crystallization of ZnO Nanopartides by Spray Flash Evaporation versus Batch Synthesis", Chem. Eng. Technol. 35, No. 8, 2015.

* cited by examiner

*Primary Examiner* — Clinton A Brooks
*Assistant Examiner* — Jerica Katlynn Wilson
(74) *Attorney, Agent, or Firm* — WCF IP (57) ABSTRACT

The invention relates to a chemical synthesis method, the said method comprising "Spray Flash Evaporation", also commonly referred to by the corresponding initialism SFE, which comprises the chemical reaction of at least one first compound with at least one second compound, under conditions in which the first compound and the second compound react to form at least one third compound.
The invention also relates to a device for implementing this method and the compounds obtained by this method.

22 Claims, 4 Drawing Sheets

SYNTHESIS OUTSIDE HIGH AND LOW TEMPERATURE EQUILIBRIUM BY SPRAY FLASH SYNTHESIS

The invention relates to a chemical synthesis method and device for the chemical synthesis of organic, inorganic, and metallic products and any one of the mixtures thereof, by a technique of instant evaporation or flash evaporation or also commonly referred to as "Spray Flash Synthesis" (or "SFS" the corresponding initialism).

The invention relates to compounds or particles thus obtained by SFS.

STATE OF THE ART

Particle preparation methods for preparing particles, in particular nanoparticles, are known in the prior art. However, the prior art methods are essentially of the discontinuous or "batch" type. In general, sol-gel type techniques are used. However, the sol-gel techniques have performance limitations in terms of the quantity of products produced and the quality of the products obtained, in particular as regards the morphology and purity thereof. Up to the present time, industrial needs, in respect of nanoparticles in particular, have been met by discontinuous processing techniques of the sol-gel type.

More broadly, for the synthesis of chemical compounds, industrial needs have thus far been met through the use of chemical reactions with at times relatively low yields, for example, though not solely, esterification reactions using conventional discontinuous "batch" techniques with yields reaching a ceiling at 60%. Obtaining an increase in these yields, if only by a few percent, would represent a very significant gain given that it involves significantly high tonnages of the synthesised products.

Satisfying the industrial need also involves the use of various products which simply are not quite good enough from the perspective of the intrinsic qualities thereof, for example the oxides obtained by sol-gel techniques whereof separation of impurities thus always remains a problem, as well as the need to perform a post-synthesis thermal treatment in order to crystallize them in a satisfactory manner, which has the effect of causing the enlargement of the particles and consequently followed by severe agglomeration (sintering) thereof.

The limitations of current synthesis techniques include obtaining products of less than desirable quality (from the standpoint of the crystallinity thereof, size of the particles obtained, and/or presence of impurities, etc) and a fortiori, with yields that are in need of improvement. These techniques also require, in certain cases, additional purification steps that are lengthy and therefore costly.

In addition, the majority of the existing techniques, due to their limitations (in particular not having the possibility of being able to locally finely control the reaction) do not provide the ability to produce appropriate products or the desired products, in particular during a "one pot" synthesis".

OBJECTS OF THE INVENTION

The object of the invention is to solve the technical problem consisting of providing a compound preparation method and device for the continuous or discontinuous preparation of compounds, in particular in the form of particles, and in particular particles of micrometric, submicrometric, or nanometric size.

The object of the invention is in particular to solve the technical problem consisting of facilitating or making possible the preparation of crystallised particles.

In particular, the object of the present invention is to solve the technical problem consisting of providing compounds, in particular in the form of particles, that present suitable properties for applications in the various fields of application for chemical compounds.

The object of the invention indeed is also to solve the technical problem consisting of making possible the preparation of compounds, in particular in the form of particles, which are not accessible by conventional techniques, notably of the sol-gel type.

The object of the invention indeed is also to solve the technical problem consisting of producing compounds, in particular in the form of particles, by improving the yields of the reactions.

DESCRIPTION OF THE INVENTION

The invention provides the means to solve at least one, and preferably all of the technical problems raised in accordance with the invention.

The invention relates to a groundbreaking invention, referred to as "SFS" for "Spray Flash Synthesis" (as per the accepted English terminology).

The invention relates to a chemical synthesis method, the said method comprising "Spray Flash Evaporation", also commonly referred to by the corresponding initialism SFE, which comprises the chemical reaction of at least one first compound with at least one second compound, under conditions in which the first compound and the second compound react to form at least one third compound.

The invention also relates to a chemical synthesis device for implementing the synthesis method, the said device including:
  at least one first tank comprising:
    a supply of a liquid composition comprising or constituted of a first compound;
    at least one pressurisation device for pressurising under a pressure P1, P1 being preferably selected from a pressure range of 3 to 300 bars;
    at least one heating device;
  at least one second tank comprising:
    a supply of a liquid composition comprising or constituted of a second compound;
    at least one pressurisation device for pressurising under a pressure P1', P1' being preferably selected from a pressure range of 3 to 300 bars and being either equal to or different from P1;
    at least one heating device;
  the said first compound and second compound being reactive together;
  an atomisation chamber comprising:
    at least one dispersion device for dispersing the liquid compositions of each tank, preferably at an angle ranging from 30 to 150°, and at a pressure P2 that is lower than P1 and P1', P2 being preferably selected from a pressure range that extends from 0.0001 to 2 bars, the dispersion devices being positioned in a manner such that the first compound and the second compound react together in the droplets formed in the atomisation chamber, the said dispersion device being preferably heated by a heating device at a temperature that is selected from within a range of 200 to 2000° C.;

at least one separation device for separating liquids; and optionally one or more compound recovery device/s for recovering the third compound formed by reaction of the first compound and the second compound.

The invention also relates to a chemical synthesis device for implementing the synthesis method, the said device including:

at least one tank comprising:
  a supply of one or more liquid compositions comprising the first compound and/or the second compound;
  at least one pressurisation device for pressurising under a pressure P1, P1 preferably being selected from a pressure range of 3 to 300 bars;
  at least one heating device;
the said first compound and second compound being reactive together;

an atomisation chamber comprising:
  at least one dispersion device for dispersing the fluid in each tank, preferably at an angle ranging from 30 to 150°, and at a pressure P2 that is lower than P1, P2 being preferably selected from a pressure range that extends from 0.0001 to 2 bars, the said device being preferably heated by a heating device at a temperature that is selected from within a range of 200 to 2000° C.;
  at least one separation device for separating liquids; and
  optionally one or more compound recovery devices for recovering the third compound formed by reaction of the first compound and the second compound.

The SFS technique according to the invention is a novel technique derived from SFE, but which incorporates a conceptual breakthrough in the approach for/to the synthesis and a technical breakthrough. These breakthroughs constitute a real revolution in general in chemical synthesis (organic and inorganic synthesis).

The conceptual breakthrough consists in carrying out a synthesis of one or more chemical compounds by passing from the medium that is subjected to over-pressure upstream of a nebulisation (spray) nozzle, to a primary vacuum downstream of the latter. The synthesis is thus integrated into a vacuum atomisation method, represented by the SFE technique. The synthesis according to the invention may be carried out both through a single nebulisation nozzle or by causing intermingling of jets from multiple nebulisation nozzles. It is thus possible to achieve an almost infinite number of different types of syntheses and products to be synthesised.

The invention is described with reference to the first, second and third compounds in a generic manner. Thus, the invention covers any embodiment of chemical synthesis including the reaction between two or more reactive compounds (referred to herein on purely arbitrary basis, always as first and second compounds) in order to form at least one or more third compounds (referred to herein on purely arbitrary basis, always as third compound). The terms 'first compound' and 'second compound' are therefore arbitrary so as to denote at least two compounds that are reactive with one another. The terms alluding to 'third compound' are therefore arbitrary so as to denote at least one reaction product of reaction between at least two reactants. Thus, the invention covers for example the reaction between at least two compounds, which are reactive, in order to form one or more third compound/s, as product/s of the reaction.

According to one variant, it is of interest according to the invention for the first compound and the second compound to be in liquid form until the reaction thereof and for the third compound to be in solid form. The conditions, in particular of temperature and pressure of the method and device according to the invention are therefore advantageously selected accordingly.

According to one variant, the reaction is carried out between two compounds in different states (liquid, solid, gas), such as for example between a solid and a liquid, such as for example for the synthesis of nitrocellulose, wherein the cellulose is solid and the nitrating agent ($HNO_3$) is liquid.

The invention advantageously makes possible a very localised synthesis, in highly restricted spaces (notion of micro-, or even nano-reactors, or indeed even metastable reactors, etc) constituted by the drops that are significantly even finer than those of the SFE of earlier patents, in particular due to being subjected to greater heating, and which form nano-reactors or micro-reactors, or intersections of different nano-reactors or micro-reactors (case of multiple nozzles) in which the chemical reaction of the synthesis takes place. This provides the ability to advantageously produce a very localised, targeted synthesis, while avoiding any runaway due to the mass effects (accumulation of heat) resulting from the use of excessively large quantities of reactants. In a particularly advantageous manner, this chemical reaction implemented according to the invention makes it possible to shift the thermodynamic equilibrium of the reaction carried out under "standard" reaction conditions without any SFE device or method. This is thus referred to as out-of-equilibrium synthesis. This shift explains at least in part the improvement in yields observed according to the present invention.

In addition, due to the possibility of heating the nozzle, it is possible in certain cases to directly obtain the desired crystalline phase of the product while avoiding a subsequent thermal treatment phase, in order to obtain the desired product. In certain cases, when this proves necessary, it is also necessary to provide for post-treatments in the aerosol of compounds, in particular in the form of particles, for example in crystallised form. Thus, According to one variant, the compounds obtained in particular in the form of particles, are crystalline, preferably with the crystalline phase being controlled during the passage through the dispersion device.

Advantageously, the invention enables continuous synthesis (going up to several kilogrammes per hour), that is indeed much more controlled than most of the techniques that exist. According to one embodiment, the invention makes it possible to synthesise molecules and obtain the crystallisation of the synthesised molecules. Advantageously, this synthesis is carried out very locally in a device according to the invention, in order to facilitate the chemical reactions by promoting contact between the reactants (first and second compounds), in particular so as to increase the yields and/or to augment the safety of the synthesis. Thus, the invention constitutes a technique that is much more efficient than many others, even all of the existing chemical synthesis techniques.

Different (third) compounds can thus be synthesised such as oxides, ceramics or organic products, for example energetic materials, medicinal products, esters or organic compounds in general, conductive or non-conductive polymers, catalysts or transition metal complexes. The synthesis can take place by making use of a nebulisation device (or "spray") having a single nozzle or the products may be synthesised in the intersection of the jets of multiple nozzles, each bearing and providing the different (one/more first and second) compounds to be brought into contact in order to synthesise the different products (third compound).

According to one embodiment, the nozzles spray the jets which come into contact with each other. For example, with two nozzles, the jets are positioned opposite each other.

The invention also relates to a device and method comprising a heating device or a heating step for heating the one or more nebulisation (spray) nozzle/s thereby enabling the rise to a high temperature, in general greater than 200° C. Advantageously, the device and method include a flow regulation means or device for regulating the flow or flows of the first compound and of the second compound. According to the prior art, the flow rate was regulated via the pressure through the nozzle. According to the invention, it is possible to use a flow meter positioned on the supply lines of the nozzles in a manner so as to finely regulate the flow in order to better control the reactions being implemented according to the invention. The flow rates of a given nozzle may be regulated independently of the flow rates of other nozzles.

When it is indicated that the dispersion device is heated, it is in particular the one or more nebulisation nozzle/s which are heated. The one or more nebulisation nozzle/s are heated over a very wide temperature range which typically ranges from 20° C. to 2000° C. Typically, the temperature of the one or more nozzle/s is between 20° C. and 2000° C. According to one variant, the temperature of the one or more nozzle/s is between 40° C. and 2000° C. According to one variant, the temperature of the one or more nozzle/s is between 40° C. and 200° C. Advantageously, the device and method according to the invention comprise a thermal treatment means or device for thermal treatment (heating) of the aerosol formed. Typically, the thermal treatment means or device is arranged so as to apply heat either to the nozzle itself or downstream of the nozzle and for example in the upper part of the atomisation chamber, that is to say in the proximity of the nebulised jets in the atomisation chamber. This advantageously makes it possible to calcine or crystallize in a more complete manner certain desired products, formed by the reaction of the reactants.

According to one variant, the device comprises a device or means for thermal treatment that is selected from heating by microwaves, by pulsed light (flashes), laser, infrared light (radiation), or another suitable heating means. The thermal treatment means or device may be a source of radiation, for example by microwave, preferably positioned in a manner such that the radiations reach at least the outlet of the one or more nozzle/s and thus provide for sufficient heating.

According to one variant, the one or more nebulisation nozzle/s are heated in a very wide temperature range which typically goes from 200° C. to 2000° C., and for example from 250° C. to 2000° C., or even for example from 300° C. to 1500° C.

According to one embodiment, the dispersion device is heated by electrical resistance and/or induction and/or by vibrations (ultrasound or other).

According to one variant, nozzles made of ceramic material are advantageously used.

Advantageously, the heating of the dispersion device makes it possible to decrease to an even greater extent than for the SFE, the size of the liquid droplets formed on account of the faster and more controlled evaporation of the solvents or of the dispersion products. The SFS technique according to the invention also reduces the subsequent costs due to the efficacy of the products the synthesis whereof is made possible by SFS. Thus medicinal products, fertilisers, organic products in general and in a more general manner more efficacious materials, for example semiconductors with adjusted band gap would be obtained. The medicinal products obtained, because of their greater efficacy, would be used in dosages (and therefore tonnages) involving lower quantities, which would consequently lower the ecological footprint thereof, and thereby promote sustainable development.

This heating step or technical device provides a technical advantage by accomplishing two very important functions, namely to enable evaporation of the solvents or dispersion fluids to take place even more rapidly than in the case of SFE, while at the same time also ensuring execution of a thermal treatment process, such as for example the calcination of the products obtained, which often provides for the optimal crystallisation thereof. This thermal treatment process, for example in the sol-gel type techniques according to the prior art, often is brought about far too long after the synthesis of the materials, which makes it difficult to obtain optimal products, from which it is often difficult to separate the impurities. The present invention therefore advantageously makes it possible to carry out continuous "one pot" syntheses of crystallised or non-crystallised materials.

The method of synthesis according to the invention may advantageously be implemented on a large scale and can, for example, achieve or even exceed production capacities of several kilogrammes per hour.

The invention relates to a preparation method that comprises atomisation, and in particular by instant evaporation or flash evaporation, which makes it possible to provide a solution to all or part of the problems of the methods of the state of the art.

The invention relates to compounds, in particular in the form of particles, and to the methods of preparation thereof, in particular to a compound preparation method for preparing compounds in particular in the form of particles, the said method comprising the simultaneous atomisation of at least one first compound and of at least one second compound, under reaction conditions for reacting at least the first compound and the second compound in order to form at least one third compound. The device according to the invention operates under reaction conditions for reacting at least the first compound and the second compound in order to form at least one third compound.

As indicated above, the term "first compound" is used to denote a compound that is different from the "second compound". There may be multiple compounds that are denoted as "first compounds". Reference is made to the said one or more "first compound/s" essentially to distinguish the latter from the one or more "second compound/s".

The SFS technique according to the invention therefore relates to chemical synthesis, that is to say the formation of new crystallised or non-crystallised molecules, in the form of particles, and in particular nanoparticles (of which preferably at least one dimension or the greatest dimension is less than 100 nm (nanometre)), particles of which at least one dimension or the greatest dimension is submicrometric (preferably less than 1 μm) or micrometric (preferably less than 1 mm).

According to one embodiment, the one or more first compound/s and the one or more second compound/s are dissolved and/or dispersed in one or more solvent/s, and are sent through one or more nozzle/s at ambient temperature or heated in a chamber maintained under primary vacuum (typically from 100 to 0.1 Pa).

In this chamber, the one or more third compound/s are synthesised in the crystallised or non-crystallised state in the form of nanometric, submicrometric or micrometric particles.

According to one particular variant, the particles of the invention are particles with all of the dimensions thereof, advantageously being less than 1000 nm.

According to one variant, the particles are nanoparticles, that is to say, with at least one and preferably all of the dimensions thereof, advantageously being less than 100 nm.

The invention relates in particular to solid particles, and more particularly to particles with the smallest dimension and preferably all of the dimensions thereof ranging from 30 to 100 nm.

According to one variant, the particles synthesised comprise or are constituted of one or more metallic elements.

According to one variant, the particles synthesised comprise or are constituted of one or more organic compounds.

By way of non-exhaustive examples, mention may be made of: the synthesis of esters by means of esterification reactions by mixing alcohols and acids; the synthesis of nitrocellulose by means of the reaction of nitration of cellulose or nitration of molecules with sterically hindered sites; the synthesis of conductive polymers such as, for example, polyaniline; the synthesis of oxides, in particular metal oxides such as, for example, $TiO_2$, ZnO, $Fe_2O_3$ or mixtures thereof; the synthesis of titanate such as, for example, bismuth titanate; the synthesis of sulfides (chalcogenides (such as cadmium telluride, hydrogen selenide, molybdenum disulfide, indium tin oxide (ITO), sodium telluride, zinc selenide)) or non-oxides; synthesis of rare earths, carbonaceous materials such as $C_3N_4$ or other ceramics and carbonaceous compounds; and catalysts, starting from the respective precursors thereof; or even the synthesis of MOF ("Metal Organic Frameworks") by means of one or more nozzles.

Preferably, the compounds that may be synthesised according to the method of the invention are selected from metal oxides, for example $TiO_2$, titanates, for example bismuth titanate, and MOFs, for example the MOF referred to as "HKUST-1" (for Hong Kong University of Science and Technology).

According to one embodiment of the invention, the compounds that may be synthesised according to the method of the invention are $TiO_2$ nanoparticles having, for example, an average diameter of between 100 and 250 nm. Preferably, the $TiO_2$ nanoparticles obtained according to the method of the invention have, for example, an anatase type structure, an average diameter of between 100 and 250 nm, and for example a Brunauer-Emmett-Teller (BET) specific surface area of between 5 and 20 $m^2/g$.

According to another embodiment of the invention, the compounds that may be synthesised according to the method of the invention are bismuth titanate nanoparticles. Preferably, the bismuth titanate nanoparticles primarily comprise a $Bi_2Ti_2O_7$ crystalline phase.

Among the compounds that may be synthesised according to the present invention, by way of example mention may be made of the following compounds or compounds in the following technical fields:

Medicines, galenics, pharmaceutics, perfumery;
Energetic materials: explosives (primary and secondary) and propellant powders;
Cosmetics;
Oxides and ceramics;
Phytosanitary products;
Agri-food sector;
Pigments and paints;
Organic chemistry;
Semiconductors;
Catalysis;
Energy storage, in particular hydrogen storage.

The method according to the invention relates to the preparation of particles, and in particular nanoparticles, of compounds selected from energetic compounds, pharmaceutical compounds, phytopharmaceutical compounds, medical contrast compounds, fluorescent compounds, optical compounds, dye compounds, aromas and flavouring agents, fragrances (perfume), pigments, inks, paints, metals, metal oxides, semiconductor compounds, optical compounds, optoelectronic compounds, ferroelectric compounds, non-linear response compounds or bio-electronic compounds.

The method according to the invention is particularly advantageous for the preparation of particles, and in particular nanoparticles, of crystallised compounds selected from metal compounds, oxides thereof, and any of the mixtures thereof.

Also in an advantageous manner, the method according to the invention provides the ability to prepare particles, and in particular nanoparticles, which are micrometric in size or which have at least one dimension that is less than 500 µm, preferably which have at least one dimension that is less than 100 µm.

Also in an advantageous manner, the method according to the invention provides the ability to prepare particles, and in particular nanoparticles, which are submicrometric in size or which have at least one dimension comprised between 100 and 1000 nm.

The term "size"—of particles—is used to refer to the diameter or the smallest dimension for particles that are not substantially spherical, and advantageously all of the dimensions of the particles. The size of particles may be measured by scanning electron microscopy and by transmission.

In a preferred manner, the method according to the invention provides the ability to prepare particles, and in particular nanoparticles, which are nanometric in size or which have at least one dimension that is less than 100 nm.

In a more preferred manner, the particles, and in particular the nanoparticles, prepared according to the invention have a size ranging from 2 to 100 nm; or ranging from 5 to 90 nm; or ranging from 10 to 80 nm; or ranging from 50 to 300 nm; or ranging from 50 to 200 nm; or ranging from 50 to 120 nm; or ranging from 10 to 100 nm; or ranging from 60 to 100 nm.

According to another variant, the third compound is obtained in the form of particles, for example of which at least one dimension is less than 100 nm, with preferably the greatest dimension ranging from 5 to 100 nm, more preferably ranging from 10 to 30 nm.

The particles of the invention may include, for example, semiconductor compounds, and/or co-crystals or composites, which are advantageously doped.

The compounds of the invention may also include fluorescent materials, in particular for medical, therapeutic or diagnostic applications, such as in radiology, by way of example without any limitation.

The compounds of the invention may also include compounds that are active ingredients from a pharmaceutical standpoint, in particular for the preparation of medicinal products or for pharmaceutical or therapeutic applications. Such compounds, in particular in the form of particles, provide the means in particular to improve biocompatibility, bioavailability and bodily assimilation.

In the medical field, the invention makes it possible to increase the tracking power for diagnostics, in particular in radiology and medical imaging in general.

The compounds of the invention, in particular in the form of particles, may also comprise catalysis materials, such as, for example, materials for heterogeneous catalysis, in particular for applications in petrochemistry by way of example, without being limiting.

The invention is also particularly suitable in the field of development of semiconductors with band gap adapted and adjusted so as to increase the efficiency of photocatalytic or photoconversion systems.

In the pharmaceutical field, the invention serves to enable the development of materials having improved biocompatibility, and for example the coating of substances that are toxic or whose toxicity is to be diminished by at least one biocompatible surface layer or skin/rind. Thus the present invention is particularly advantageous in chemotherapy in order to limit the toxicity of the compounds used.

The present invention also serves to enable the preparation of multilayer particles.

The term "multilayer particles" is used to refer to a particle comprising a core (also known as a "kernel") and at least one layer on the surface of the core. The surface of the core is preferably completely covered with a layer. Thus, the particles of the invention relate to particles that comprise a core and a surface layer covering, preferably completely, the surface of the core. The present invention also relates to particles, in particular nanoparticles, comprising a core and multiple surface layers arranged in a concentric manner.

One or both, of the core and one or more surface layers may be obtained by reacting of at least one first compound and a second compound. Thus, according to one embodiment, the third synthesised compound may be coated with one or more surface layers. According to one embodiment, one or more compounds may be coated with one or more surface layers comprising one or more third synthesised compounds. In all of the variants and embodiments, modes of implementation, either preferred or advantageous, each layer may be constituted independently of the other layers, of one or more compounds, it being possible for the one or more compound/s of one layer to be different from the one or more compound/s of another layer.

The invention also relates to organic/inorganic or organic/metallic hybrid type particles.

The invention moreover also relates specifically to particles that are able to be obtained by a method as described according to the invention, the said particles comprising at least one third synthesised compound.

According to one variant, the method includes the formation of particles comprising the said third compound, the said particles being in liquid, solid or gaseous form.

The invention relates more specifically to a method that includes:
(a) preparation of a liquid phase comprising the first compound and the second compound in order to form an atomisable liquid composition;
(b) heating of the liquid composition at a pressure P1 that is higher than atmospheric pressure, with P1 preferably ranging from 3 to 300 bars, and the heating being carried out at a temperature that is higher than the boiling point of the liquid phase;
(c) atomisation of the liquid composition comprising the first compound and the second compound, the atomisation preferably being carried out in an atomisation chamber by means of a dispersion device at a pressure P2 that is lower than P1, with P2 preferably ranging from 0.0001 to 2 bars;
(d) obtaining of the said third compound by reacting of the first compound and the second compound; and
(e) optionally, separation of the third compound from the liquid phase.

The separation of liquids from the synthesised compounds, in particular in the form of particles, advantageously occurs during atomisation.

According to one variant, the method includes:
(a) preparation of a first liquid phase comprising the first compound in order to form a first liquid composition placed in a first tank, and the preparation of a second liquid phase comprising the second compound that forms a second liquid composition placed in a second tank;
(b) heating of the first composition, under a pressure P1, at a temperature that is higher than the boiling point of the liquid, and heating of the second composition under a pressure P1', preferably P1 and P1', which may be equal or different, are higher than atmospheric pressure, more preferably, P1 and P1', independently of one another, range from 3 to 300 bars, the heating of each liquid composition being carried out at a temperature that is higher than the boiling point respectively of the liquid phase considered; and
(c) simultaneous atomisation of the first and second compositions heated under pressure, in an atomisation chamber by means of at least one dispersion device under a pressure P2 that is lower than P1, preferably ranging from 0.0001 to 2 bars, with the said dispersion preferably being carried out under heating conditions, preferably at a temperature of between 20° C. and 2000° C.;
(d) obtaining of the said third compound by reacting of the first compound and the second compound; and
(e) optionally, separation of the said third compound from the liquid phases.

According to another variant, the first compound and/or the second compound are independently liquid or solid or gaseous.

According to another variant, independently, the first and the second liquid phases comprise or are constituted respectively, of the first compound in liquid form, optionally after dissolution in a solvent, or in solid form dispersed in a solvent, and/or of the second compound in liquid form, optionally after dissolution in a solvent, or in solid form dispersed in a solvent, the solvents of the first and second liquid phases possibly being identical or different.

According to one variant, the method includes the dispersion or dissolution of the first solid compound in a first liquid.

According to one variant, the method includes the dispersion or dissolution of the second solid compound in a second liquid.

According to one variant, the first and second liquids are different or identical.

According to one variant, the first compound in liquid form constitutes the first fluid composition.

According to one variant, the second compound in liquid form constitutes the second fluid composition.

Advantageously, the reaction is carried out under pressure and temperature conditions appropriate for obtaining the third compound in solid form.

According to one variant, the device or method of the invention makes use of a multiphase fluid comprising particles dispersed in a liquid phase in a manner so as to form the one or more third synthesised compound/s, preferably in the form of micrometric, submicrometric or nanometric particles.

According to one variant, the method of the invention makes use of a monophasic fluid comprising particles dispersed in a liquid phase in a manner so as to form the one or more third synthesised compound/s, preferably in the form of micrometric, submicrometric or nanometric particles.

According to one variant, the first composition comprising the first solid compound forms a monophasic fluid.

According to one variant, the first composition contains a solution of titanium isopropanolate (TTIP) in isopropanol, and advantageously provides the means to obtain titanium dioxide or titanates, for example bismuth titanate.

According to one variant, the first composition comprising the first solid compound forms a multiphase fluid.

According to one variant, the second composition comprising the second solid compound forms a monophasic fluid.

According to one variant, the second composition comprising the second solid compound forms a multiphase fluid.

Within the meaning of the invention, the term "liquid" in particular is understood to refer to a liquid optionally comprising one or more solid dispersions and/or one or more gases.

Within the meaning of the invention, the term "fluid" in particular is understood to refer to a liquid optionally comprising a solid dispersion. In the invention, this term "fluid" does not cover a gas in which solid particles are dispersed.

Pursuant to the present invention, the term "multiphase fluid" is used to refer to a fluid comprising one or more immiscible phases such as for example a liquid phase and a solid phase or two immiscible liquid phases.

According to one variant, the multiphase fluid consists of a liquid phase and at least one solid phase preferably dispersed in the form of particles and typically in the form of nanoparticles.

According to one variant, the multiphase fluid is constituted of a liquid phase and several solids preferably dispersed in the form of particles and typically in the form of nanoparticles.

According to one variant, the multiphase fluid is constituted of two liquid phases.

According to one variant, the multiphase fluid is constituted of multiple liquid phases and multiple solid phases, preferably dispersed in one or more liquid phases in the form of particles, and typically in the form of nanoparticles, the said solid phases possibly being dispersed in different liquid phases.

The term "liquid phase" is used to refer to a liquid phase comprising one or more liquid compounds. A compound is defined as "liquid compound" in particular when it is liquid at the prevailing temperature and pressure under the conditions after obtaining of the multiphase fluid. According to one variant, the compound is liquid at ambient temperature and pressure, that is to say at 25° C. and 101325 Pa.

Among the liquid compounds, mention may in particular be made of the solvent or dispersing agents of the first and/or second compounds used in the context of the present invention. When the method of the invention includes heating of the first and second compositions, the heating of the first and second compositions may be simultaneous or independent of one another.

According to one specific variant, the method of the invention includes the following steps:
dispersion of at least one solid organic or inorganic/mineral compound in a liquid;
dissolution of at least one organic or inorganic/mineral compound in a liquid, it being possible for the liquids comprising the dispersed compound or the dissolved compound to be identical or different;
simultaneous or independent heating, under pressure, of the liquids comprising the dispersed compound and the dissolved compound;
atomisation of the liquids comprising the dispersed compound and the dissolved compound;
obtaining of particles, and in particular nanoparticles, and separation of the nanoparticles obtained from the liquids.

The method according to the invention is advantageously carried out in a continuous or semi-continuous manner. Preferably, it is carried out in a continuous manner implemented.

In an equally preferable manner, the method according to the invention comprises the preparation of at least two phases, a first liquid phase that comprises at least one liquid compound, referred to as first liquid compound, and at least one solid-, organic-, inorganic/mineral-, or organometallic compound, referred to as first solid compound; and a second liquid phase that comprises at least one liquid compound, referred to as second liquid compound, and at least one organic-, inorganic/mineral-, or organometallic compound, referred to as second solid compound, dissolved in the liquid phase. These liquid phases can each independently comprise a plurality of these compounds.

According to one variant, the method includes the preparation of particles that comprise of one or more layers surrounding a core. It is possible for example to prepare such particles by iteration of the method according to the invention by reusing the particles formed via the method, that is to say that the particles formed via the method of the invention once again are subjected to the method of the invention in order to deposit on the surface at least one new surface layer with or without the synthesis reaction for synthesising a new third compound. Thus, the particles dispersed in step a) could themselves be the particles to be coated with one or more layers. According to this variant each time that of the method of the invention is iterated, one or more additional surface layers are deposited over the particles.

According to one variant, the method includes the preparation of particles that comprise multiple layers surrounding the core of the particles by making use of compounds having different solubilities in the liquids in which they are dissolved. For example, when the solubilities are sufficiently different, the compound that is least soluble is deposited first on the surface of the particles and following thereafter, the compound that is more/most soluble is deposited over the surface of the layer of the compound (with lower/lowest solubility) which is already deposited on the surface of the particles.

According to one variant, the method includes the dispersing of a compound intended to form the core of the particles in a first liquid that comprises a compound intended to form a first surface layer and the dissolving in a second liquid of a compound intended to form a second surface layer. Preferably, the solubility in the second liquid of the compound intended to form the second surface layer is higher than the solubility in the first liquid of the compound intended to form the first surface layer.

According to one variant, the method includes the preparation of crystalline particles comprising of multiple crystals, referred to as co-crystals.

The selection of the one or more liquid/s in particular may be adapted according to the compound to be dispersed or the compound to be dissolved.

In a preferred manner, the heating of the one or more fluid composition/s is, independently of one another, carried out under a pressure ranging from 5 to 150 bars, preferably ranging from 10 to 60 bars.

By way of solvent, mention may be made of alkanes, for example pentane (PE=36° C.), cyclopentane (PE=49° C.), or hexane (PE=68° C.), as also cyclohexane (PE=81° C.); organic acids (such as, for example, formic acid, oxalic acid, or trifluoroacetic acid); water (PE=100° C.); alcohols, for example methanol (PE=65° C.) or ethanol (PE=78-79° C.); thiols, for example ethane-thiol (PE=35° C.); aldehydes, for example ethanal (PE=20° C.) or propionic aldehyde (PE=48° C.); ketones, for example acetone (PE=56° C.); ethers, methylal (Dimethoxymethane, PE=42° C.), for example methyl-tert-butyl ether (PE=55° C.) or tetrahydrofuran (PE=66° C.); acid esters, in particular formic acid esters, for example methyl formate (PE=32° C.), acetic acid esters, for example methyl acetate (PE=57-58° C.); amines, for example trimethylamine (PE=2-3° C.), halogenated hydrocarbons; and in a more general manner azeotropic liquids and mixtures.

Advantageously, the composition comprising the dispersed solid compound also comprises at least one dispersing agent.

In a preferred manner, the method according to the invention includes a final compound recovery step for recovering the synthesised compounds, in particular in the form of particles. Advantageously, the recovery of the particles is carried out by means of one or more particle retention devices selected from an electrostatic separator, a cyclone, a cyclone comprising an electrostatic device and filtres (metal mesh, foams, sintered filtres, etc). Thus, according to one variant, the method includes the final recovery of particles comprising the third synthesised compound, for example by means of one or more retention devices for retaining particles, selected from a filtre, an electrostatic separator, a cyclone, a cyclone comprising an electrostatic device and a filtre.

The conditions for implementing the method according to the invention may vary quite widely, in particular as a function of the synthesised compounds, that for example, form the particles, or else as a function of the liquids used.

The present invention relates in particular to a synthesis method for out-of-equilibrium synthesis of a third compound starting out from a first compound and a second compound by means of reacting the first compound and the second compound with one another by effectively implementing a device or method for Spray Flash Evaporation (SFE).

In an advantageous manner, the heating of the compositions is carried out under a pressure ranging from 5 to 150 bars or ranging from 10 to 60 bars. Where the implementation makes use of multiple solutions, the heating of each solution, respectively may be carried out under a pressure ranging from 5 to 150 bars or ranging from 10 to 60 bars, the latter may be identical or different for each composition.

Also in an advantageous manner, the reaction is carried out with heating of the one or more fluid composition/s, either independently or dependently of one another, preferably under pressure of an inert gas. According to one variant, the heating of the compositions is carried out under pressure of an inert gas selected from nitrogen, argon, helium, neon, xenon, sulfur hexafluoride ($SF_6$), and chlorofluorocarbon (CFC), etc.

According to one variant, the heating of the compositions is carried out under pressure of one or more reactive gases. For example, the reactive gas may constitute the first and/or the second compound and participate in the synthesis reaction for synthesising the third compound.

Typically, the atomisation of the one or more composition/s is, independently, carried out at a pressure ranging from 0.001 to less than 1 bar, preferably from 0.02 to 0.2 bar, and/or at an angle of 60 to 80°.

According to one variant, the pressure of the atomisation chamber (P2) is 10 times, preferably 100 times, indeed preferably 1000 times, or even 10,000 times, lower than the overpressure applied during heating (P1).

The dispersion device made use of during the atomisation of the compositions is advantageously selected from among a hollow cone nozzle, a solid cone nozzle, a flat jet nozzle, a rectilinear jet nozzle, a pneumatic atomiser and combinations thereof. A hollow cone nozzle is particularly advantageous.

In a general manner, the atomisation may be effected at an angle which may vary very widely, and preferably at an angle ranging from 30 to 150°. A range of possible atomisation angles from 60 to 80° may also be mentioned.

These conditions are also applicable when atomising at least two compositions.

The invention also relates to a device that enables the implementation of the method.

By way of information, some examples of points of improvement that are made possible by the device and the method according to the invention are as follows:

1) An increase in the yields of synthesis reactions such as esterification reactions. These reactions, which consist in reacting alcohols with acids, are often limited to yields of 60%, or even less depending in particular on the nature of the alcohol. The device and the method according to the invention greatly increase the reaction yield.

2) The synthesis of conductive polymers such as polyaniline, whether pure or in nanocomposites.

3) The synthesis of nitrocellulose (cellulose nitration). The device and the method according to the invention provide the means to obtain a nitrocellulose molecule which is more stable over time, unlike existing techniques which often mix solid and liquid phases. The device and method according to the invention mitigate the problems of instability of nitrocelluloses which are weakly nitrated (varnish) or highly nitrated (propellant powders) such that there is no longer any need to use stabilisers in order to prevent degradation of the latter, for example hazardous decompositions which could lead to dangerous explosions in the case of more highly nitrated nitrocelluloses.

4) Nitration reactions of molecules where the targeted sites are relatively sterically hindered. These reactions carried out on large quantities, often experience delays in nitration, and can subsequently result in reaction runaway very quickly when large quantities are present and when the nitration reaction then takes place instantaneously. The nitration reaction that the device and the method according to the invention serve to facilitate, in particular continuously, and locally on very small quantities, avoids delays, and very greatly augments the safety of nitrations.

5) The synthesis of MOF ("Metal Organic Frameworks") by using one or more nebulisation nozzles.

6) The synthesis reactions for synthesising various different oxides or mixtures of oxides by making use of one or more nebulisation nozzles. Provided in this instance are examples such as $TiO_2$, $ZnO$, $Fe_2O_3$, $WO_3$, $Bi_2O_3$, etc., including complex oxides. Here the advantage offered by a device and the method according to the invention consists both in continuously producing particles of very small sizes, often never before achieved, as well as in the ability to obtain them in the targeted crystalline state after the calcination thereof by passage through a heated nozzle (heating of the particles formed by flash evaporation (microwave, light flash, etc) at the temperature that is appropriate for the type of compound.
7) The synthesis of other ceramics or carbonaceous materials such as $C_3N_4$ or mixtures in particular through the thermal decomposition of different precursors, this occurring by making use of a single nozzle or a plurality of nozzles.
8) Acid base reactions (formation of water that evaporates))
9) Complexation reactions (ligands/metal centre)

The invention also relates to compounds or particles that are amenable to being obtained by a method according to the invention.

The present invention makes it possible to produce, for example, structures of synthesised compounds, in particular in the form of particles, in a continuous and reproducible manner, and is in a sense more efficient than discontinuous or Batch type methods such as the sol-gel method. In particular, the present invention is much more efficient in terms of the quantity of products produced and the quality of the products obtained, in particular with regard to morphology, purity, etc.

The method according to the present invention is more efficient than conventional continuous or discontinuous/batch techniques in the various targeted fields of applications which are in particular:

The technique according to the present invention presents the advantage of processing only a minimal quantity of material at any time, unlike the discontinuous technique which involves the entirety of the sample.

Advantageously, the invention also makes it possible to provide for recycling of the liquids used.

Figure 1:
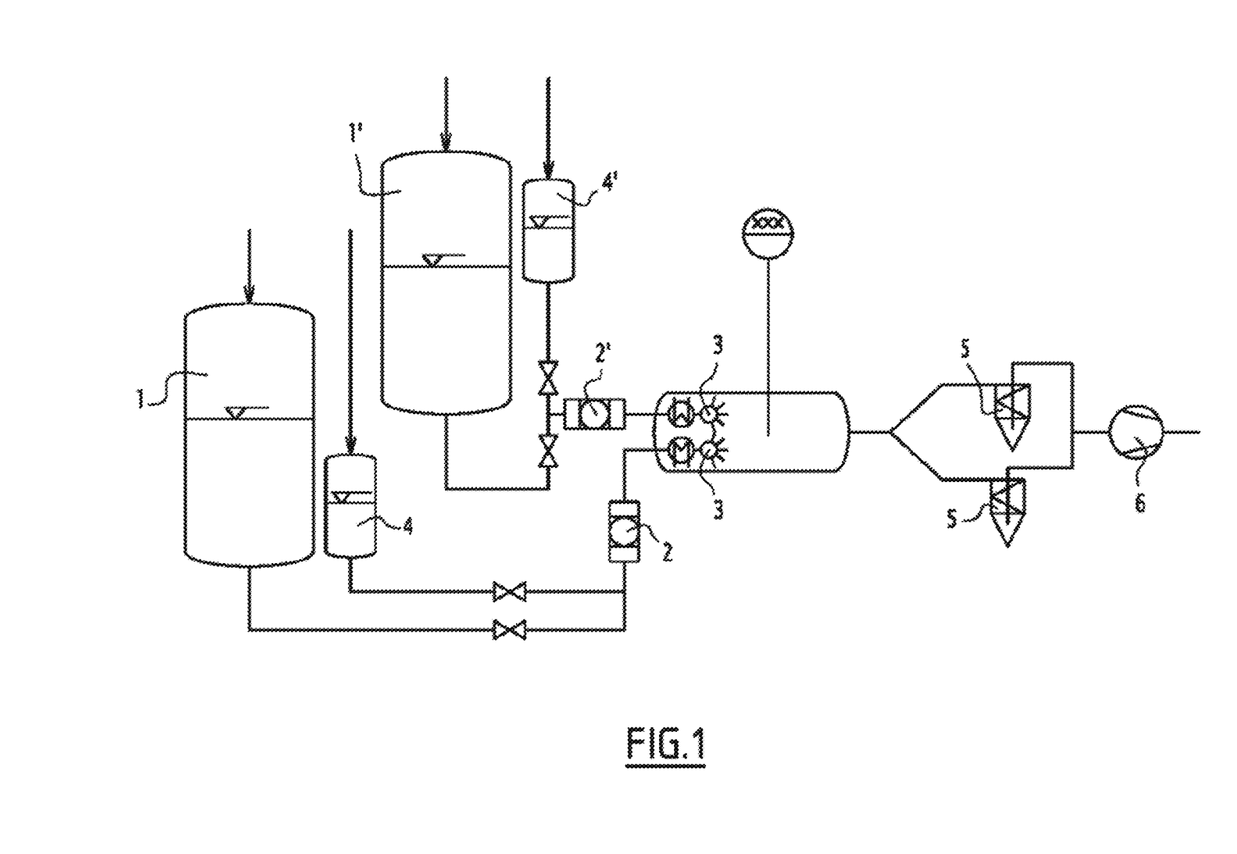
FIG. 1 shows a schematic representation of the device of the invention for the production of the synthesised compounds, in particular in the form of particles.

In the Figures:

One mode of implementation of a device according to the invention is shown in FIG. 1. The device is composed of four main parts: an assembly with set of two tanks 1 and 1' for the storage under high pressure of fluids containing the one or more substance/s to be atomised, an atomisation chamber comprising two integrated, heated ceramic nozzles 3, two axial cyclones 5 mounted in parallel and enabling semi-continuous production, a vacuum pump 6.

In the tanks 1 and 1' of 5 L capacity, which contain the fluid with the first compound or the second compound, an overpressure of compressed nitrogen is applied. At first, this overpressure displaces the oxygen and prevents the evaporation of the fluid. The volumetric flow rate in this system is induced by the overpressure of compressed nitrogen.

The filtres 2 and 2', for example of 15 µm, retain all the solid impurities, having a dimension that does not allow the passage through the filtres, in the initial fluid. The filtres allow the passing through of the first solid compound, generally in the form of nanoparticles.

Two hollow cone ceramic nozzles 3, each fitted with an electric heating system, are installed side by side in the atomisation chamber. The parameters of pressure, temperature and distribution of the particle size are controlled. The type of connection allows for a rapid change of the nozzles. The temperature for the electric heating is selected by the user and automatically regulated, in particular in order to control the crystalline phase formed. The nozzles are oriented relative to each other in a manner such as to generate intermingling jets.

A liquid tank or container 4 is filled with the same liquid as the tank 1 and is used to rinse the conduit and the nozzle after use. Likewise, the liquid tank or container 4 'is filled with the same liquid as the tank 1'.

The axial cyclones 5 are installed in parallel. During the operation, only one cyclone is in service; the second cyclone is on standby. Thanks to the centrifugal force, the solid particles are deposited within the interior of the cyclone, the gaseous components leave the cyclone by way of a plunger pipe. In order to empty the cyclone, the circuit leading to the second cyclone is firstly opened, followed thereafter by the first circuit leading to the first cyclone being closed.

The vacuum pump 6 ensures a continuous and sustained flow within the installation and provides the means to extract the vapours of liquids from the system.

Various different aspects of the invention are illustrated by the following examples.

FIGURES

FIG. 1 is a schematic representation of the device of the invention for the production of the synthesised compounds, in particular in the form of particles.

EXAMPLES

Example 1: Synthesis of MOFs (Metal Organic Frameworks)

MOFs are of great interest in the field of energy storage.
In this example, the synthesis of the coordination polymer (MOF) referred to as "HKUST-1" is illustrated.

The synthesis is carried out using an installation according to the invention that comprises two nozzles, which spray towards one another. One nozzle sprays a solution of $Cu(NO_3)_2$ with a concentration of 3.3 grammes per litre of acetone. The second nozzle sprays a solution of BTC (1,3,5-BenzeneTriCarboxylic acid) with a concentration of 1.85 grammes per litre of acetone.

Temperatures of the two nozzles: 160° C.
Pressures in the two nozzles: 40 bar.
Pressure in the atomisation chamber: 7 mbar. The reduced pressure is obtained by means of a vacuum pump in communication with the atomisation chamber.

Using the SFS method fine particles of the MOF "HKUST1" are obtained which have the chemical formula:

The conventional techniques which use for example atomisation (commonly referred to as "spray-drying") or an autoclave technique provide particles of micrometric sizes while the invention provides the means to obtain particles of smaller sizes, typically whereof the individual unit particles have one greater/greatest dimension that is less than 200 nm. They are able to form agglomerates of greater dimensions.

It is possible for the particles to be continuously prepared by a system or method according to the invention.

Example 2: Synthesis of Titanium Dioxide ($TiO_2$)

$TiO_2$ is very widely used in photocatalysis and in the energy field in general. In this example, the synthesis of particles of titanium dioxide is illustrated.

The synthesis is carried out using an installation according to the invention that comprises two nozzles, which spray towards one another. One nozzle sprays a solution of 1% mass concentration of Titanium Tetra Isopropoxide (TTIP) in isopropanol. The second nozzle sprays water.

Temperatures of the two nozzles: 160° C.
Pressures in the two nozzles: 40 bar.
Pressure in the atomisation chamber: 20 mbar. The reduced pressure is obtained by means of a vacuum pump in communication with the atomisation chamber.

Using the SFS method the according to the invention fine particles of $TiO_2$ are obtained. Conventional techniques provide nanometric particles. An installation or method according to the invention provides the means to obtain even finer particles. It is generally necessary to provide an electrostatic precipitator in order to collect these particles of small nanometre sizes (typically less than 20 nm as measured by atomic force microscopy or AFM, for example).

The invention makes it possible to limit impurities, in particular as compared to conventional sol-gel methods.

Example 3: Synthesis of Titanium Dioxide ($TiO_2$) by Hydrolysis of an Alcoholate Another example is the hydrolysis of titanium isopropanolate (TTIP) in order to produce titanium dioxide.

For this, a first solution composed of TTIP dissolved in isopropanol of High Performance Liquid Chromatography (HPLC) grade, is introduced into one of the tanks at a concentration of one percent by mass; a second solution, consisting of isopropanol and water, is placed in the other tank. The quantity of water introduced is fixed in a manner so as to have TTIP/$H_2O$ molar ratios equal to 1:1, 1:2 and 1:4.

The two solutions are mixed in a device placed upstream from the nebulisation nozzle, the temperature of which is maintained at 160° C. The reaction medium is then injected into the atomisation chamber.

Pressure in the nozzle: 40 bar.
Pressure in the atomisation chamber: 5 to 20 mbar. The reduced pressure is obtained by means of a vacuum pump in communication with the atomisation chamber.

All three of the powders recovered are amorphous, composed of elementary particles, the average diameters of which, as measured on scanning electron microscopy images (FIGS. 2, A, B and C), are typically submicrometric.

Figure 2:
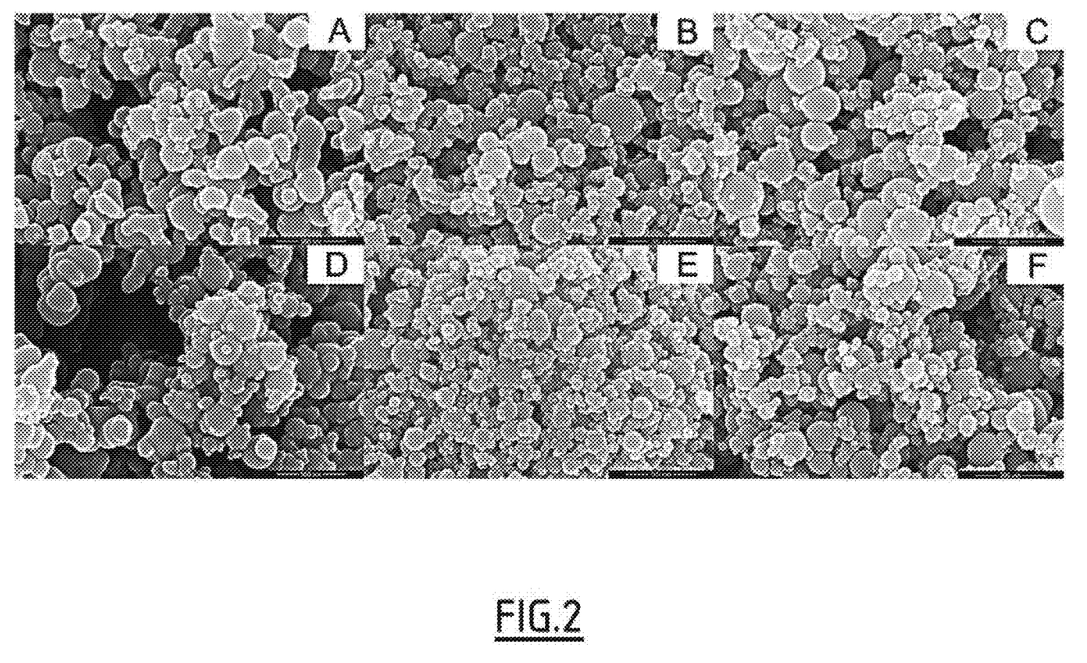
FIG. 2 represents the scanning electron microscopy images of $TiO_2$ particles formed via the method according to the invention before calcination (A, B and C) and after calcination (D, E and F).

The subsequent calcination in air, at a temperature of 400° C., for a period of 4 hours, provides anatase powders ($TiO_2$), formed of particles having submicrometric diameters (FIGS. 2, D, E and F).

The morphological and structural characteristics of the submicrometric powders obtained by the method according to the invention before and after calcination are reported in the table below.

| TTIP:$H_2O$ (mol:mol) | Before Calcination | | After Calcination | | |
|---|---|---|---|---|---|
| | Average Diameter of Particles | Structure | Average Diameter of Particles | Specific Area ($m^2/g$, BET Method) | Structure |
| 1:1 | 180 | Amorphous | 190 | 12 | Anatase |
| 1:2 | 170 | Amorphous | 139 | 15 | Anatase |
| 1:4 | 162 | Amorphous | 155 | 14 | Anatase |

Example 4: Synthesis of Bismuth Titanates

Another example is the synthesis of bismuth titanates by the method according to the invention.

In this case, a solution of bismuth nitrate (BN) in acetone, also containing acetic acid and water, is placed in a first tank. A solution of titanium isopropanolate (TTIP) in isopropanol is placed in a second tank. The two solutions are mixed in a device placed upstream from the nebulisation nozzle, the temperature of which is maintained at 160° C. The reaction medium is then injected into the atomisation chamber.

Pressure in the nozzle: 40 bar.
Pressure in the atomisation chamber: 5 to 20 mbar. The reduced pressure is obtained by means of a vacuum pump in communication with the atomisation chamber.

Depending on the BN/TTIP molar ratio, different bismuth titanates may be produced.

Figure 3:
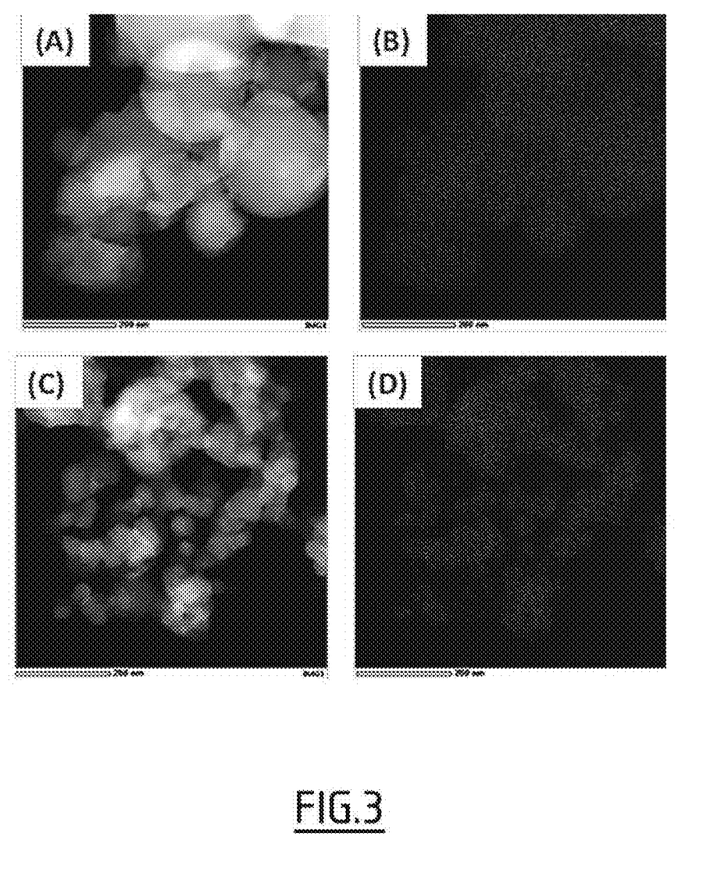
FIG. 3 represents the transmission electron microscope images of bismuth titanate particles obtained by the method according to the invention before calcination (A and B) and after calcination (C and D).

The Energy Dispersive X-Ray Spectroscopy (EDS) analyses, carried out with a transmission electron microscope on a titanate sample produced by the method according to the invention, show that the two metallic elements (Ti and Bi) are mixed with very minute matter, on an atomic scale (FIG. 3, B). Calcination in air at 650° C., for a period of 4 hours, causes the formation of a titanate, possibly with a segregation of phases (FIG. 3, D), when the titanium or bismuth are in excess relative to the stoichiometry of the titanate.

Figure 4:
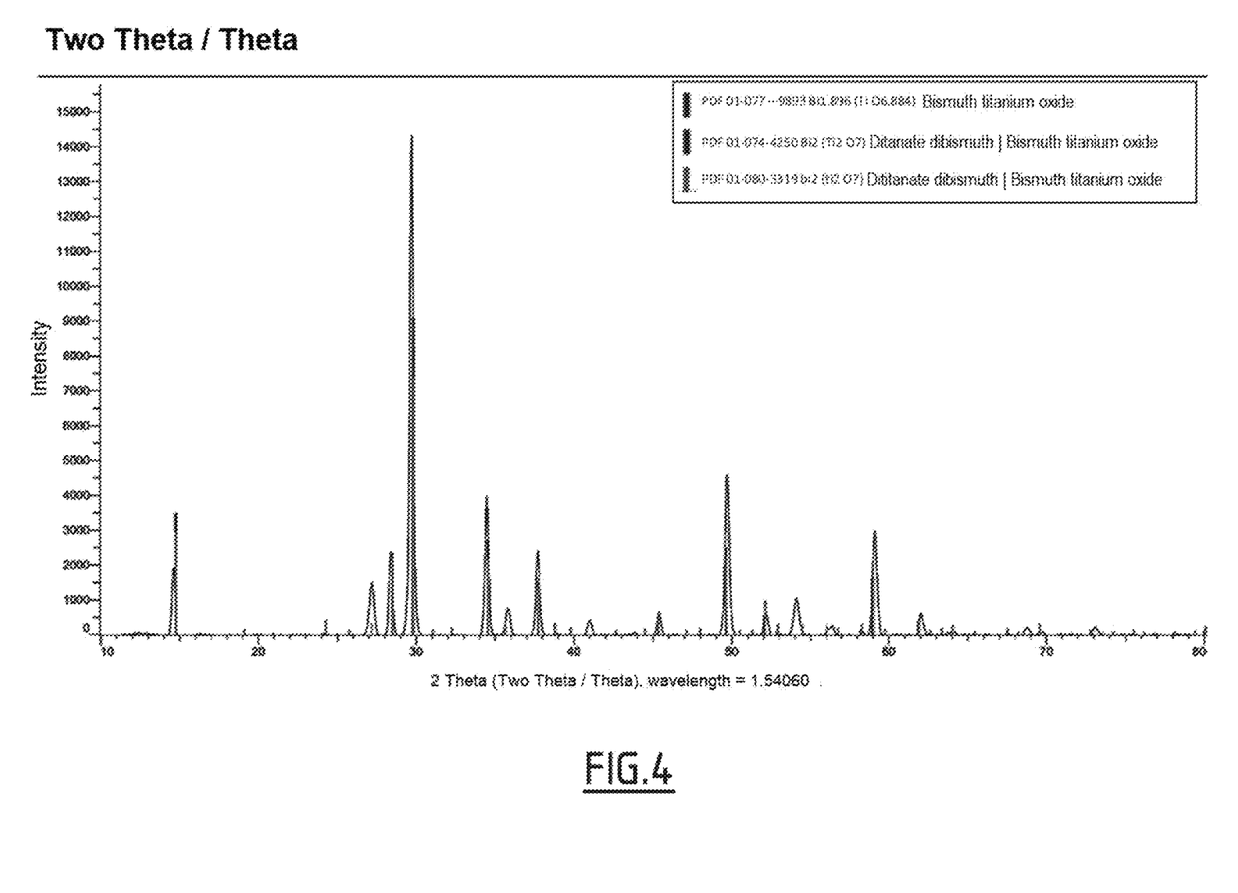
FIG. 4 is an X-ray difractogram produced on a bismuth titanate powder prepared by the method according to the invention and after calcination.

The X-ray diffraction carried out on the calcined samples (in air, at 650° C., for period of 4 hrs) clearly shows the crystallisation of titanate, in this case $Bi_2Ti_2O_7$ (FIG. 4).

Other examples of implementation of the invention are as follows:
1) Esterification reactions, Synthesis of nitrocellulose;
2) Nitration reactions;
3) Hydrolysis of alkoxides for the synthesis of oxides (eg Ti alkoxides);
4) Precipitation reactions (acid/base reaction), eg Picrates;
5) Complexation reactions (metal/ligands);
6) Synthesis of conductive polymers;
7) Synthesis of oxides;
8) Synthesis of ceramics.

The invention claimed is:
1. A chemical synthesis method, said method comprising a Spray Flash Evaporation, also commonly referred to by the corresponding initialism SFE, which comprises the chemical reaction of at least one first compound with at least one second compound, under conditions in which the first com- pound and the second compound react to form at least one third compound, said method including the following steps (a) to (d):

(a) the preparation of a first liquid phase comprising the first compound in order to form a first liquid composition placed in a first tank, and the preparation of a second liquid phase comprising the second compound that forms a second liquid composition placed in a second tank;

(b) the heating of the first composition, under a pressure P1, at a temperature that is higher than the boiling point of the liquid, and the heating of the second composition, under a pressure P1', at a temperature that is higher than the boiling point of the liquid; and (c) simultaneous atomisation of the first and second compositions heated under pressure, in an atomisation chamber by means of at least one dispersion device under a pressure P2 that is lower than P1 and P1'; and (d) obtaining said third compound by reacting of the first compound and the second compound.

2. The preparation method according to claim 1, wherein the method includes the formation of particles comprising the said third compound.

3. The preparation method according to claim 1, wherein the method further comprises, after step (d), the following step (e):

(e) the recovery of the third compound.

4. The preparation method according to claim 1, wherein the first compound and/or the second compound are independently liquid or solid or gaseous.

5. The method according to claim 1, wherein, independently, the first and the second liquid phases comprise or are constituted respectively, of the first compound in liquid form, optionally after dissolution in a solvent, or in solid form dispersed in a solvent, and/or of the second compound in liquid form, optionally after dissolution in a solvent, or in solid form dispersed in a solvent, the solvents of the first and second liquid phases possibly being identical or different.

6. The method according to claim 1, wherein the third compound is obtained in the form of particles.

7. The method according to claim 6, wherein the method includes the final recovery of particles comprising the third synthesised compound, by means of one or more retention devices for retaining particles, selected from a filter, an electrostatic separator, a cyclone, a cyclone comprising an electrostatic device and a filter.

8. The method according to claim 6, wherein at least one dimension of the particles is less than 100 nm.

9. The method according to claim 6, wherein the greatest dimension of the particles are ranging from 5 to 100 nm.

10. The method according to claim 6, wherein the greatest dimension of the particles are ranging from 10 to 30 nm.

11. The method according to claim 1, wherein the reaction is carried out by heating the first compound and the second compound, whether or not independently of one another, and in that the heating is carried out under a pressure ranging from 5 to 150 bars.

12. The method according to claim 11, wherein the heating is carried out under a pressure ranging from 10 to 60 bars.

13. The method according to claim 1, wherein the reaction is carried out by heating the first compound and the second compound, whether or not independently of one another.

14. The method according to claim 13, wherein the reaction is carried out under pressure of an inert gas.

15. The method according to claim 14, wherein the inert gas is selected from nitrogen, argon, helium, neon, xenon, sulfur hexafluoride ($SF_6$), and chlorofluorocarbon (CFC).

16. The method according to claim 1, wherein the atomisation of the one or more composition/s is, independently, carried out
at a pressure ranging from 0.001 to less than 1 bar; and/or
at an angle of 60 to 80°.

17. The method according to claim 16, wherein the pressure is ranging from 0.02 to 0.2 bar.

18. The method according to claim 1, wherein the compounds are selected from energetic compounds, pharmaceutical compounds, phytopharmaceutical compounds, medical contrast compounds, fluorescent compounds, optical compounds, dye compounds, aromas and flavouring agents, fragrances (perfume), pigments, inks, paints, metals, metal oxides, semiconductor compounds, optical compounds, optoelectronic compounds, ferroelectric compounds, non-linear response compounds or bio-electronic compounds.

19. The preparation method according to claim 1, wherein, in step (b), P1 and P1', which may be equal or different, are ranging from 3 to 300 bars.

20. The preparation method according to claim 1, wherein, in step (c), P2 is ranging from 0.0001 to 2 bars.

21. The preparation method according to claim 1, wherein step (c) is carried out under heating conditions.

22. The preparation method according to claim 21, wherein step (c) is carried out at a temperature of between 20° C. and 2000° C.

* * * * *